US012763513B2

(12) United States Patent
Kumakura et al.

(10) Patent No.: US 12,763,513 B2
(45) Date of Patent: Oct. 13, 2026

(54) CONNECTOR AND WIRE HARNESS

(71) Applicant: YAZAKI CORPORATION, Tokyo (JP)

(72) Inventors: Hideto Kumakura, Makinohara (JP); Hiroshi Shinba, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 201 days.

(21) Appl. No.: 18/749,535

(22) Filed: Jun. 20, 2024

(65) Prior Publication Data

US 2025/0007203 A1 Jan. 2, 2025

(30) Foreign Application Priority Data

Jun. 29, 2023 (JP) ................................ 2023-106589

(51) Int. Cl.
*H01R 13/52* (2006.01)
*H01R 13/621* (2006.01)
*H01R 24/28* (2011.01)

(52) U.S. Cl.
CPC ....... *H01R 13/5202* (2013.01); *H01R 13/621* (2013.01); *H01R 24/28* (2013.01)

(58) Field of Classification Search
CPC .. H01R 13/5202; H01R 13/621; H01R 24/28; H01R 4/34; H01R 2201/26; H01R 13/748; H01R 13/502; H01R 13/5205
USPC ........................................................ 174/72
See application file for complete search history.

(56) References Cited

U.S. PATENT DOCUMENTS

2011/0182694 A1* 7/2011 Nishikawa ......... H01R 13/6215 411/366.1
2020/0203882 A1 6/2020 Tanaka et al.
2021/0104829 A1* 4/2021 Miyamoto ............... H01R 9/16
2021/0367377 A1* 11/2021 Kondo .............. H01R 13/5202

FOREIGN PATENT DOCUMENTS

JP 2013-235764 A 11/2013
JP 2019-139919 A 8/2019
JP 2020-102307 A 7/2020
WO 2010/098301 A1 9/2010

* cited by examiner

*Primary Examiner* — Sidi M Maiga
(74) *Attorney, Agent, or Firm* — KENEALY VAIDYA LLP

(57) ABSTRACT

A connector includes a casing that holds, on the inside, a terminal provided at the end of an electric wire and includes a cylindrical section fitted with a mating connector of a mating device (a connection target) in a fitting direction, a packing that seals an annular space between the outer peripheral surface of the cylindrical section and the mating connector, a fastening member that is attached to penetrate the inside of the cylindrical section in the fitting direction from a through-hole formed in one end face in the fitting direction of the casing, and is fixed to a fixed wall surface of the mating device in a state in which the cylindrical section and the mating connector are fitted, and a seal member that seals an annular gap between the outer peripheral surface of the fastening member and the inner surface of the through-hole.

5 Claims, 5 Drawing Sheets

CONNECTOR AND WIRE HARNESS

CROSS-REFERENCE TO RELATED APPLICATION(S)

The present application claims priority to and incorporates by reference the entire contents of Japanese Patent Application No. 2023-106589 filed in Japan on Jun. 29, 2023.

BACKGROUND OF THE INVENTION

1. Field of the Invention

The present invention relates to a connector and a wire harness.

2. Description of the Related Art

As a technique concerning a connector of the related art, for example, Japanese Patent Application Laid-open No. 2020-102307 A discloses a connector including a casing including a cylindrical section fitted with a mating connector of a connection target in a fitting direction, a packing that seals an annular space between an outer peripheral surface of the cylindrical section and the mating connector, and a fastening member that fixes the casing and a fixed wall surface of the connection target on the outer side of the cylindrical section.

Incidentally, in the connector described in Japanese Patent Application Laid-open No. 2020-102307 A explained above, for example, it is necessary to fix, with the fastening member, the casing and the fixed wall surface of the connection target on the outer side of the cylindrical section, that is, on the outer side of a waterproof region by the packing. Therefore, it is likely that the casing relatively increases in size.

SUMMARY OF THE INVENTION

The present invention has been made in view of the circumstances described above, and an object of the present invention is to provide a connector and a wire harness that can suppress an increase in the size of a casing.

In order to achieve the above mentioned object, a connector according to one aspect of the present invention includes a casing including a cylindrical section that holds, on an inside, a terminal provided at an end of an electric wire and is fitted with a mating connector of a connection target in a fitting direction; a packing that seals an annular space between an outer peripheral surface of the cylindrical section and the mating connector; a fastening member that is attached to penetrate the inside of the cylindrical section in the fitting direction from a through-hole formed in one end face in the fitting direction of the casing, and is fixed to a fixed wall surface of the connection target in a state in which the cylindrical section and the mating connector are fitted with each other; and a seal member that seals an annular gap between an outer peripheral surface of the fastening member and an inner surface of the through-hole.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according to the present invention is explained in detail below with reference to the drawings. Note that the present invention is not limited by the embodiment explained below. Constituent elements in the embodiment explained below include those that can be easily substituted by those skilled in the art or those that are substantially the same. In the present specification, ordinal numbers are used only to distinguish components, members, parts, positions, directions, and the like and do not indicate order and priority.

Embodiment

Figure 1:
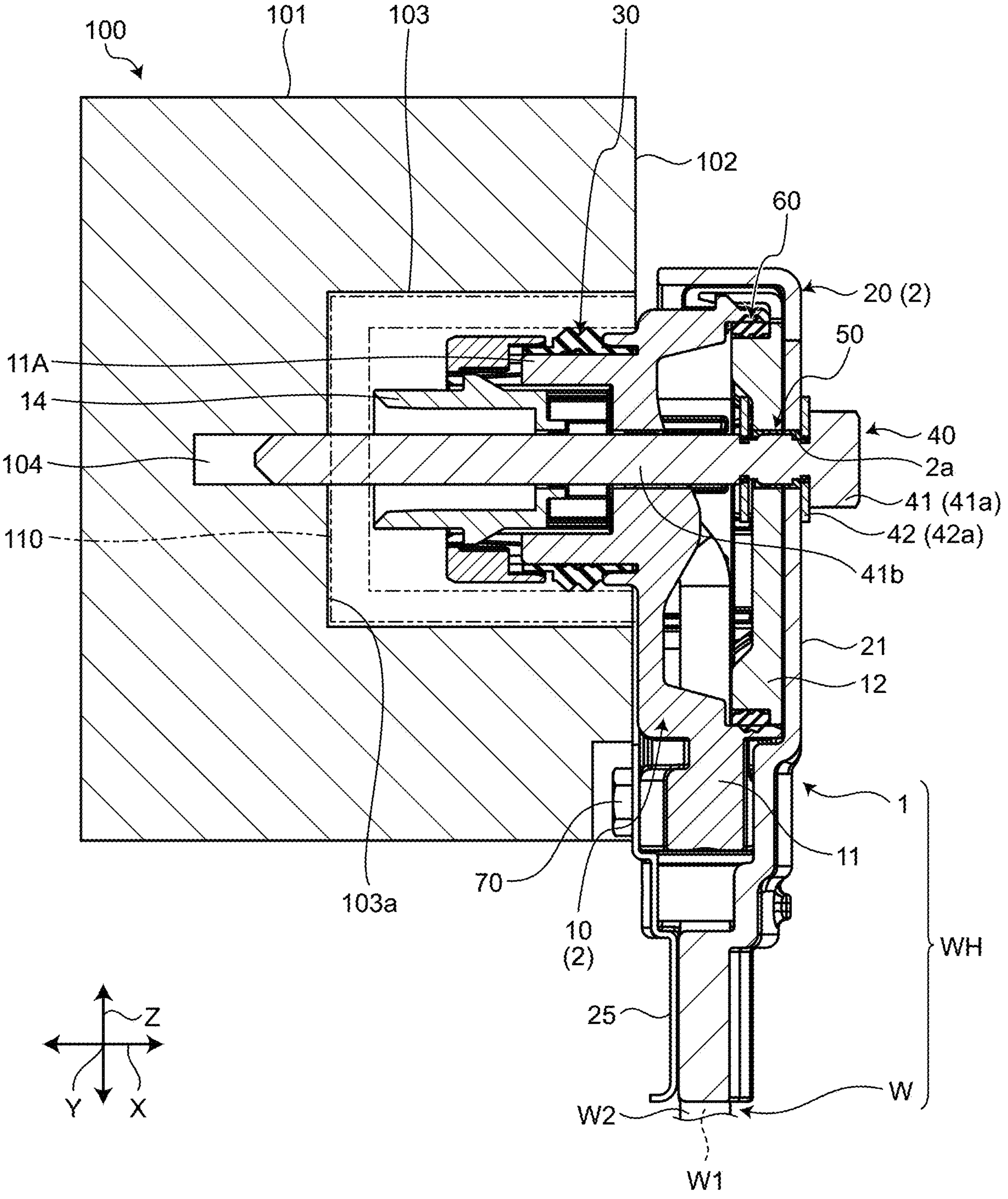
FIG. 1 is an exemplary cross-sectional view of a wire harness to which a connector according to an embodiment is applied.

FIG. 1 is a cross-sectional view of a wire harness WH to which a connector 1 according to an embodiment is applied. The connector 1 in the present embodiment illustrated in FIG. 1 is incorporated in the wire harness WH routed in a vehicle such as an automobile. Here, in the wire harness WH, for example, for connection among devices mounted on the vehicle, a plurality of electric wires W used for power supply and signal communication are bundled to form a collective component and the plurality of electric wires W are connected to the devices by the connector 1 and the like. The wire harness WH in the present embodiment includes, for example, the plurality of electric wires W having conductivity and the connector 1 provided at the ends of the plurality of electric wires W. Besides, the wire harness WH may further include a protector and a fixture.

In the following explanation, among a first direction, a second direction, and a third direction intersecting one another, the first direction is referred to as "fitting direction X", the second direction is referred to as "width direction Y", and the third direction is referred to as "height direction Z". Here, the fitting direction X, the width direction Y, and the height direction Z are substantially orthogonal to one another. The fitting direction X is typically equivalent to an inserting and removing direction (a fitting direction) of the connector 1 and a mating connector 110, the front-rear direction (the thickness direction) of the connector 1, and the like. The height direction Z is typically equivalent to the longitudinal direction (the up-down direction) of the connector 1, an extending direction of the electric wire W, an inserting direction of the electric wire W through the connector 1, and the like. The width direction Y is typically equivalent to the width direction (the left-right direction) of the connector 1 and the like. Directions used in the following explanation are explained as directions in a state in which the electric wire W is assembled to the connector 1 unless specifically noted otherwise.

The electric wire W includes, for example, a linear conductor section W1 having conductivity and an insulating coating W2 having insulation that covers the outer side of the conductor section W1. The electric wire W is an insulated electric wire in which the conductor section W1 is covered with the insulating coating W2. The conductor section W1 in the present embodiment is a core wire obtained by bundling a plurality of metal element wires having conductivity but may be a stranded core wire obtained by twisting together the plurality of metal element wires. The insulating coating W2 is an electric wire coating that coats the outer peripheral side of the conductor section W1. The insulating coating W2 is formed by, for example, extrusion-molding an insulative resin material (PP, PVC, crosslinked PE, or the like; selected as appropriate considering abrasion resistance, chemical resistance, heat resistance, and the like) and the like.

The electric wire W is formed to linearly extend in the height direction Z and extend with substantially the same diameter with respect to the height direction Z (an extending direction). In the electric wire W, for example, a cross-sectional shape (a cross-sectional shape intersecting the height direction Z) of the conductor section W1 is formed in a substantially circular shape and a cross-sectional shape of the insulating coating W2 is formed in a substantially annular shape. The electric wire W is formed in a substantially circular cross-sectional shape as a whole. In the electric wire W, the insulating coating W2 is peeled off at least at one end and terminals 3 (see FIG. 4) explained below are crimped to the conductor section W1 exposed from the insulating coating W2.

Here, the connector 1 in the present embodiment is mechanically and electrically connected to a mating device 100 serving as a connection target (see FIG. 1). The connector 1 is inserted into a connector insertion hole 103 formed in a housing 101 of the mating device 100 to be fitted with the mating connector 110 and forms an electrical connection part with the mating connector 110. The connector 1 includes, for example, a casing 2 including a cylindrical section 11A to be fitted with the mating connector 110 and a fastening member 40 inserted from a through-hole 2*a* formed in one end face in the fitting direction X of the casing 2 and fixed to a fixed wall surface 103*a* of the mating device 100 in a state in which the cylindrical section 11A and the mating connector 110 are fitted. One end face of the casing 2 is an end face on the side opposite to the cylindrical section 11A in the fitting direction X.

The connector insertion hole 103 is provided in a wall surface 102 on one side (the connector 1 side) in the fitting direction X of the housing 101 of the mating device 100. The connector insertion hole 103 is, for example, a recess recessed from the wall surface 102 toward the other side in the fitting direction X and opened toward one side in the fitting direction X. The mating connector 110 is housed on the inner side of the connector insertion hole 103. The connector insertion hole 103 is a portion into which the cylindrical section 11A is inserted and fitted in a state in which the connector 1 is fitted with the mating connector 110. An opening shape of the connector insertion hole 103 is formed along the outer diameter shape of the cylindrical section 11A. For example, the opening shape of the connector insertion hole 103 viewed in the fitting direction X is formed in a substantially elliptical shape.

The fixed wall surface 103*a* is a wall surface of the bottom of the connector insertion hole 103 and is a portion to which the connector 1 is fixed by the fastening member 40. The fixed wall surface 103*a* is formed in a uniform flat surface shape. The fixed wall surface 103*a* is provided with a fastening hole 104 to which the fastening member 40 is fastened. A bolt 41 of the fastening member 40 is fastened to the fastening hole 104 in a state in which the connector 1 is fitted with the mating connector 110. The fastening hole 104 is a hole in which a screw groove is formed on the inner peripheral surface. A shaft section 41*b* of the bolt 41 is screwed in the fastening hole 104.

Figure 2:
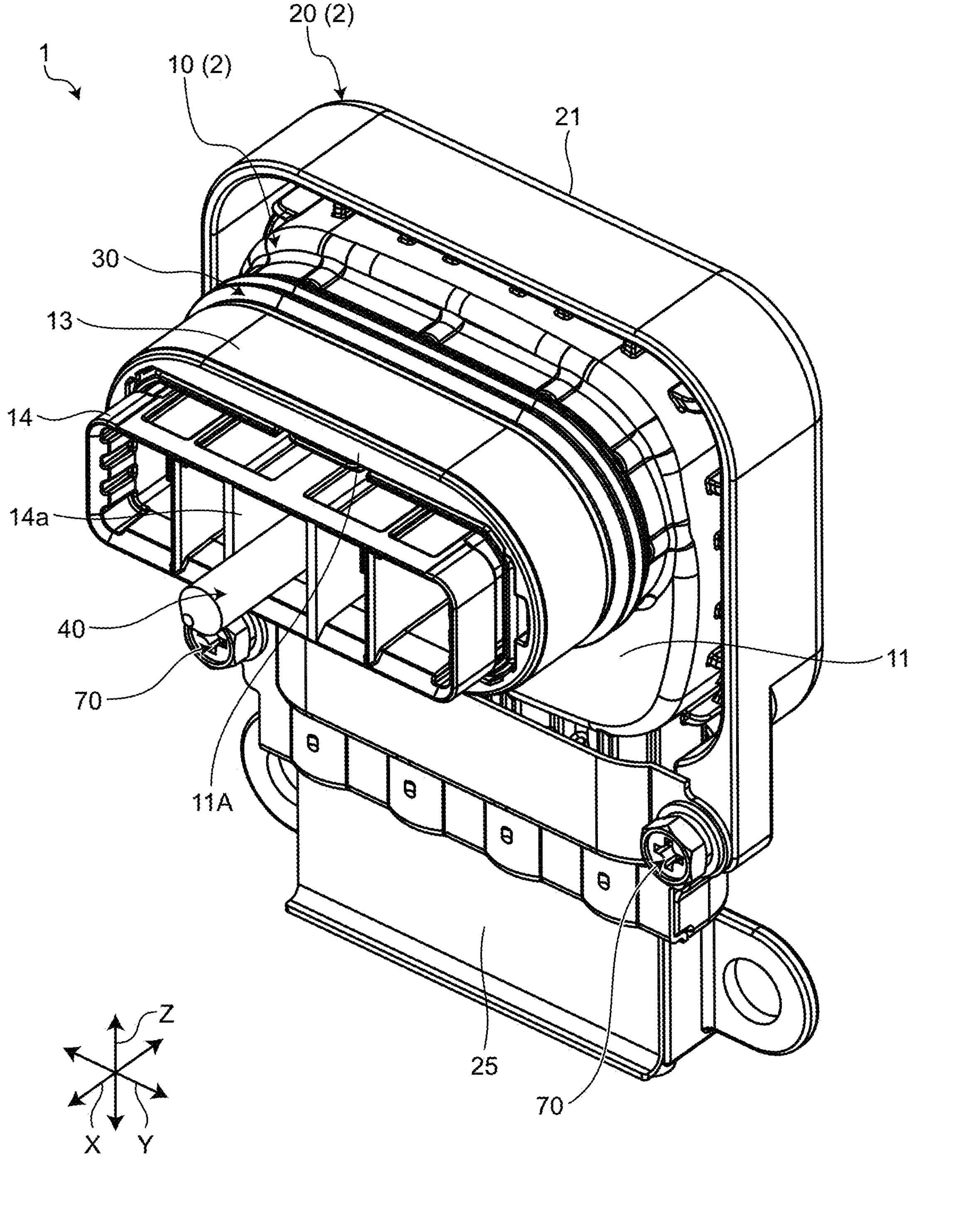
FIG. 2 is an exemplary perspective view of the connector according to the embodiment.
Figure 3:
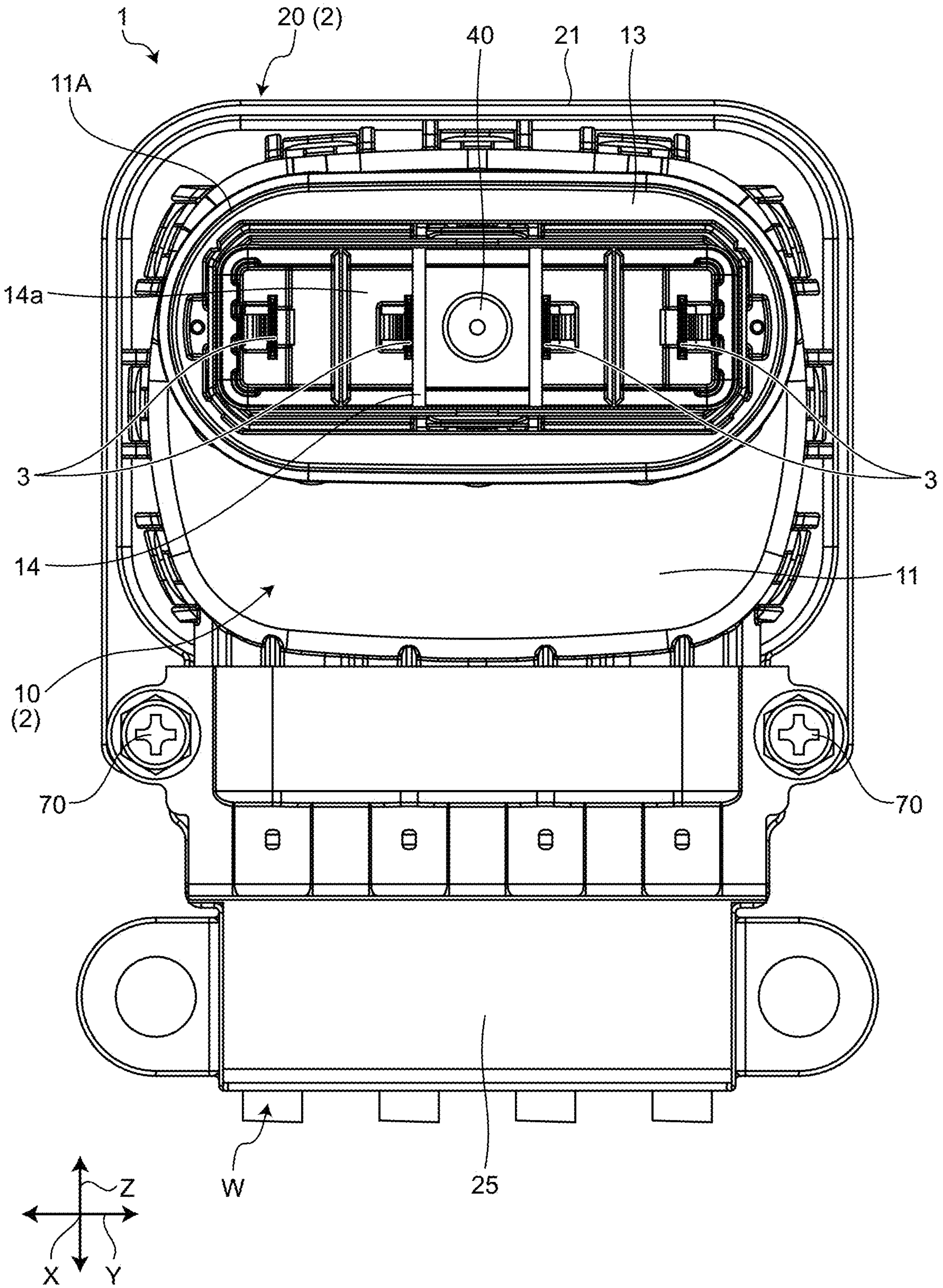
FIG. 3 is an exemplary plan view of the connector according to the embodiment.
Figure 4:
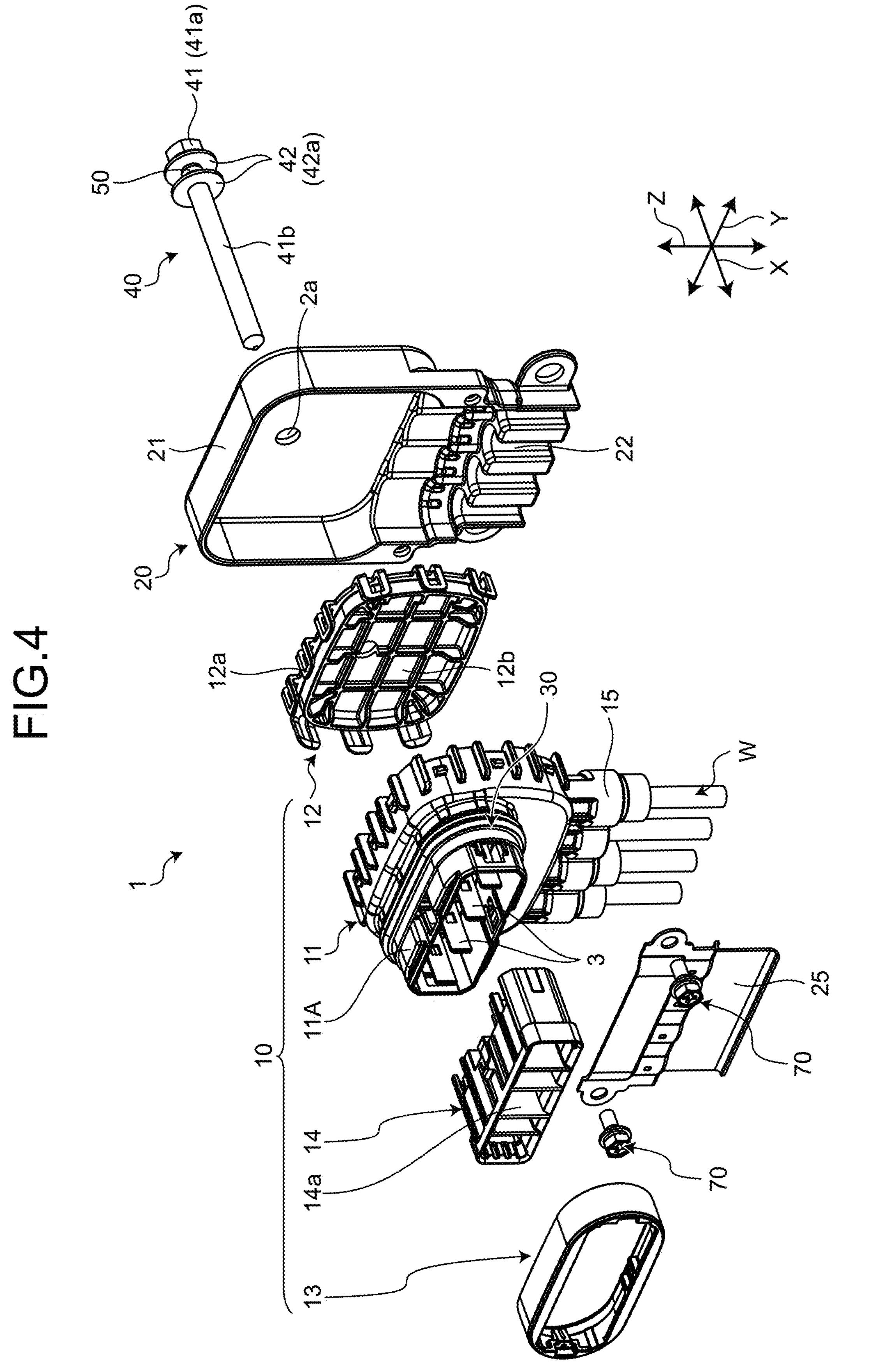
FIG. 4 is an exemplary exploded perspective view of the connector according to the embodiment.

FIG. 2 is a perspective view of the connector 1, FIG. 3 is a plan view of the connector 1, and FIG. 4 is an exploded perspective view of the connector 1. As illustrated in FIGS. 2 to 4, the connector 1 includes, for example, the casing 2 configured by combining a plurality of components including a housing 10 and a shield shell 20, a plurality of packings 30 and 60, the fastening member 40, and a seal member 50 explained below. The connector 1 is used for, for example, the wire harness WH including the electric wire W for power supply for supplying electric power from an inverter to a motor in a vehicle such as a hybrid automobile or an electric automobile. In the present embodiment, a case in which the connector 1 is configured as a male connector and the mating connector 110 is configured as a female connector is exemplified. However, the present embodiment is not limited to this example.

The housing 10 is a portion of the casing 2 that holds the terminals 3 on the inside and includes the cylindrical section 11A fitted with the mating connector 110. As illustrated in FIG. 4, the housing 10 is configured by a combination of a plurality of parts. Specifically, the housing 10 includes, for example, a housing main body 11, a rear cover 12, a front holder 13, and an inner housing 14. The housing main body 11, the rear cover 12, the front holder 13, and the inner housing 14 are respectively formed by resin materials having insulation. In the present embodiment, the cylindrical section 11A is provided in the housing main body 11 of the housing 10 and protrudes in a cylindrical shape from the housing main body 11 toward the other side (the mating connector 110 side) in the fitting direction X.

The housing main body 11 and the rear cover 12 are members that are assembled to each other to house the terminals 3 on the inside. The terminals 3 are male terminal fittings made of a metal material having conductivity and is electrically connected to female terminals of the mating connector 110. In the present embodiment, in the housing main body 11, four terminals 3 are provided to be spaced apart from one another in the width direction Y. The terminals 3 include, for example, electrical connection sections electrically connected to the female terminals of the mating connector 110 and electric wire crimping sections electrically connected to the end of the electric wire W. Note that, a case in which the housing main body 11 and the rear cover 12 house the four terminals 3 in a state in which the housing main body 11 and the rear cover 12 are assembled to each other is exemplified. However, the number of terminals 3 is not limited to four.

The housing main body 11 is formed, for example, with both sides in the fitting direction X opened. In the housing main body 11, in a state in which the terminals 3 are housed in the cylindrical section 11A, the terminals 3 are exposed to the outside from an opening on the other side in the fitting direction X and, on the other hand, an opening on one side in the fitting direction X is closed by the rear cover 12. The housing main body 11 is formed in, for example, a substantially rectangular shape as a shape viewed in the fitting direction X. The housing main body 11 faces the wall surface 102 of the mating device 100 in a fitted state in which the cylindrical section 11A is fitted with the mating connector 110. A plurality of electric wire insertion sections 15 are provided at the lower end portion of the housing main body 11.

The electric wire insertion section 15 is a portion through which the electric wire W is inserted. The electric wire insertion section 15 is formed to protrude to the lower side in the height direction Z from the lower end portion of the housing main body 11. The electric wire insertion section 15 is formed in a cylindrical shape. The electric wire W is routed on the inner side of the electric wire insertion section 15 in the height direction Z. That is, the housing main body 11 holds the terminals 3 in the fitting direction X. The electric wire W is drawn out in the height direction Z orthogonal to the fitting direction X. Here, in the housing main body 11, four electric wire insertion sections 15 provided side by side in the width direction Y. The electric wire W is inserted through each of the four electric wire insertion sections 15.

The rear cover 12 is a member for closing the opening of the housing main body 11 from one side in the fitting direction X. The rear cover 12 includes, for example, a cover section 12*b* that covers the opening of the housing main body 11 and a plurality of locking sections 12*a* locked to the outer peripheral surface of the housing main body 11. The rear cover 12 is integrated with the housing main body 11 by snap-fitting by the locking sections 12*a* in a state in which the cover section 12*b* covers the opening of the housing main body 11.

The front holder 13 is, for example, a member for holding the packing 30 between the front holder 13 and the housing main body 11. The front holder 13 is formed in a cylindrical shape along the outer peripheral surface of the cylindrical section 11A and is fitted with the outer peripheral surface of the cylindrical section 11A. For example, when viewed in the fitting direction X, the front holder 13 is formed in a substantially elliptical cylindrical shape. The front holder 13 is integrated with the cylindrical section 11A by claw fitting or the like in a state in which the packing 30 is sandwiched between the front holder 13 and the housing main body 11.

The packing 30 prevents foreign matters such as moisture and dust from intruding into the inside of the connector 1 from an annular gap between the mating connector 110 and the outer peripheral surface of the cylindrical section 11A. The packing 30 is formed of an elastically deformable member such as rubber or resin. For example, the packing 30 is formed in a substantially elliptical cylindrical shape extending along the outer peripheral surface of the cylindrical section 11A and is fitted with the outer peripheral surface of the cylindrical section 11A. The packing 30 is interposed between the mating connector 110 and the cylindrical section 11A on one side in the fitting direction X of the front holder 13 in a fitted state in which the cylindrical section 11A is fitted with the mating connector 110.

The inner housing 14 is a member formed separately from the housing main body 11 and is a member that houses and holds the terminals 3 in the fitting direction X in a state in which the inner housing 14 is attached to the inner side of the cylindrical section 11A. The inner housing 14 is provided with a plurality of insertion holes 14*a* through which the terminals 3 are inserted in the fitting direction X. The plurality of insertion holes 14*a* are provided side by side in the width direction Y. In other words, the plurality of terminals 3 are held in a state of being partitioned from one another in the width direction Y by the inner housing 14.

The shield shell 20 is a portion that covers the terminals 3 and the periphery of the electric wire W in the casing 2 to prevent noise caused by the electric wire W from leaking to the outside of the connector 1. As illustrated in FIG. 4, the shield shell 20 is configured by combining a plurality of components. Specifically, the shield shell 20 includes, for example, a shell main body 21 and a lower shell 25. The shell main body 21 and the lower shell 25 are respectively formed of, for example, metal materials having conductivity.

The shell main body 21 is formed in, for example, a tub shape to cover one side in the fitting direction X of the housing 10. That is, the shell main body 21 is provided with a housing space section that is opened toward the other side in the fitting direction X and in which the rear cover 12 of the housing 10 and a part of the housing main body 11 are housed. The shell main body 21 is provided with the through-hole 2*a* through which the bolt 41 of the fastening member 40 is inserted in the fitting direction X. The through-hole 2*a* is aligned and communicates with a through-hole provided in the rear cover 12 and a center hole (see FIG. 5) provided in the housing main body 11 in the fitting direction X.

An electric wire holding section 22 (see FIG. 4) that holds the electric wire W is provided at the lower end portion of the shell main body 21. The electric wire holding section 22 has a substantially U-shaped cross section opened toward the other side in the fitting direction X. The electric wire W is routed in the height direction Z on the inner side of the electric wire holding section 22. Here, in the shell main body 21, four electric wire holding sections 22 are provided side by side in the width direction Y. The electric wire W is inserted through each of the four electric wire holding sections 22.

The lower shell 25 is a portion that fixes the housing main body 11 to the shield shell 20 by being fastened to the shell main body 21 by a fastener 70 or the like. The lower shell 25 is positioned on the other side (the side opposite to the shell main body 21) in the fitting direction X with respect to the housing main body 11. The lower shell 25 is fixed to the shell main body 21 by fastening of two fasteners 70 in a state in which the electric wire insertion section 15 of the housing main body 11 is sandwiched between the lower shell 25 and the shell main body 21 in the fitting direction X.

Figure 5:
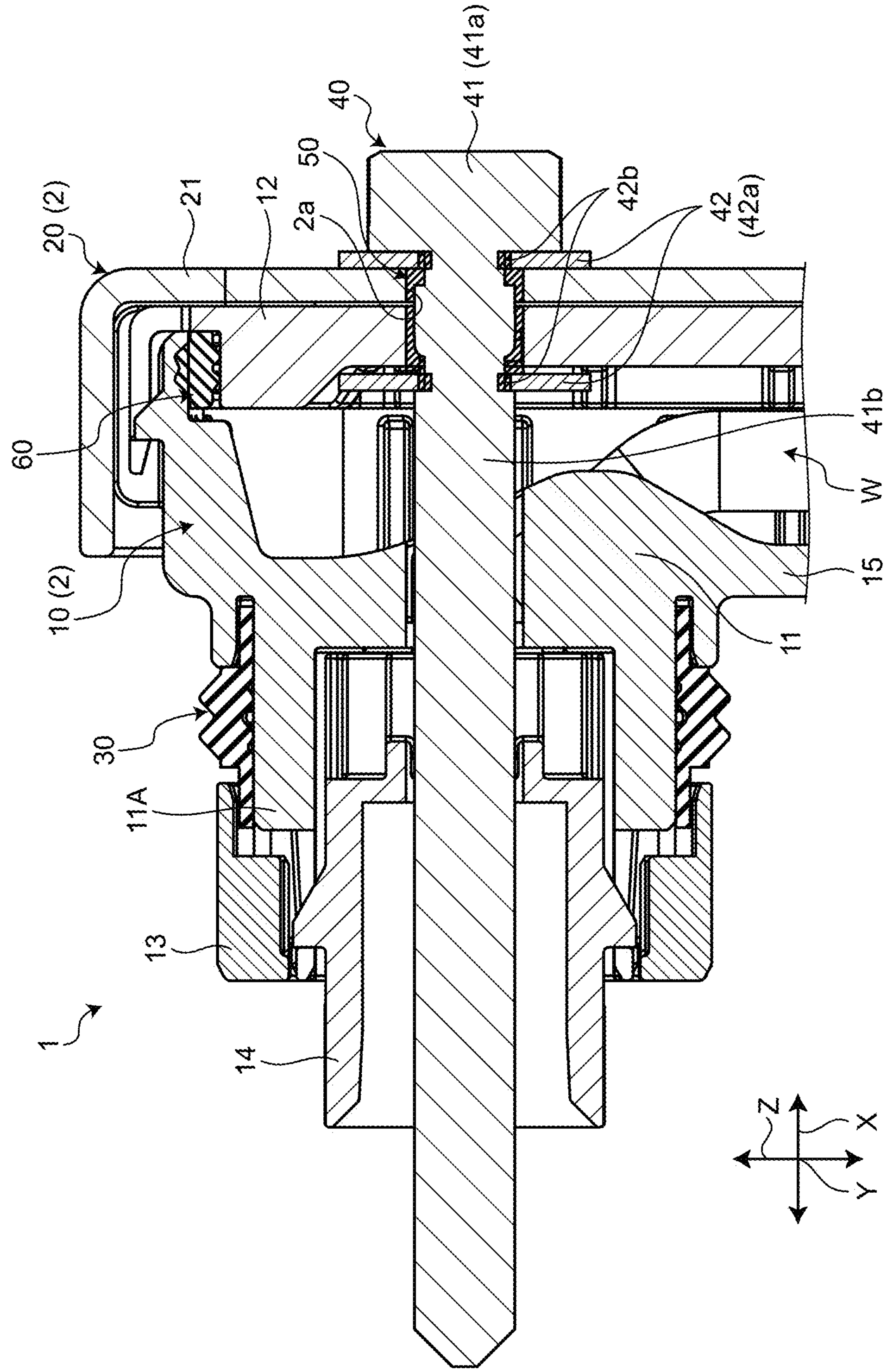
FIG. 5 is an exemplary cross-sectional view of the connector according to the embodiment.

FIG. 5 is a cross-sectional view of the connector 1. As illustrated in FIG. 5, the fastening member 40 is a member for fixing the connector 1 to the fixed wall surface 103*a* of the mating device 100 explained above. The fastening member 40 includes, for example, the bolt 41 and a waterproof washer 42. The bolt 41 includes the shaft section 41*b* extending in the fitting direction X and a head 41*a* provided at one end portion in the fitting direction X of the shaft section 41*b* and having a larger diameter than the shaft section 41*b*. The head 41*a* is formed in, for example, a hexagonal shape as a shape viewed in the fitting direction X. The head 41*a* is locked to a peripheral edge portion of the through-hole 2*a* on one end face in the fitting direction X of the shield shell 20.

The shaft section 41*b* is a portion inserted through the through-hole 2*a* of the shield shell 20, the through-hole of the rear cover 12, and the center hole of the housing main body 11 in the fitting direction X. The shaft section 41*b* is formed in a columnar shape. A spiral screw groove is formed in the fitting direction X on the surface of the shaft section 41*b*. The bolt 41 is fastened to the fastening hole 104 by being screwed into the fastening hole 104 of the fixed wall surface 103*a* explained above in a state in which the shaft section 41*b* is inserted through the through-hole 2*a* and the like. That is, the connector 1 is fixed to the fixed wall surface 103*a* of the mating device 100 in a state in which the bolt 41 penetrates the inside of the cylindrical section 11A in the fitting direction X. The bolt 41 is inserted into the center hole of the cylindrical section 11A to be positioned at the center between two terminals 3 on the inner side among the four terminals 3 explained above.

The waterproof washer 42 includes, for example, a washer main body 42*a* and water cutoff rubber 42*b*. The washer main body 42*a* is a member interposed between the head 41*a* of the bolt 41 and the peripheral edge portion of the through-hole 2*a* on one end face in the fitting direction X of the shield shell 20. The washer main body 42*a* is formed in an annular shape (a ring shape). The washer main body 42*a* has a function of suppressing interference between the head 41*a* of the bolt 41 and the shield shell 20.

The water cutoff rubber 42*b* prevents moisture and the like from intruding into the through-hole 2*a* side from an annular gap between the washer main body 42*a* and the head 41*a* of the bolt 41. The water cutoff rubber 42*b* is formed by an elastically deformable member such as rubber. The water cutoff rubber 42*b* is interposed between the inner surface of the washer main body 42*a* and the shaft section 41*b* of the bolt 41. The water cutoff rubber 42*b* is formed in an annular shape (a ring shape) extending along the inner surface of the washer main body 42*a*. In the present embodiment, the waterproof washer 42 is also provided on the other end face side in the fitting direction X of the rear cover 12. That is, the fastening member 40 is provided with a pair of waterproof washers 42 spaced apart from each other in the fitting direction X.

In the present embodiment, the shaft section 41*b* of the bolt 41 is provided with a seal member 50 adjacent to the water cutoff rubber 42*b* in the fitting direction X. The seal member 50 prevents moisture and the like from intruding into the inside of the connector 1 from an annular gap between the outer peripheral surface of the shaft section 41*b* and the inner surface of the through-hole 2*a*. The seal member 50 is formed by an elastically deformable member such as rubber or resin. The seal member 50 is interposed, for example, between the outer peripheral surface of the shaft section 41*b* and the inner surface of the through-hole 2*a* and between the outer peripheral surface of the shaft section 41*b* and the inner surface of the through-hole of the rear cover 12. The seal member 50 is formed in, for example, a cylindrical shape extending along the outer peripheral surface of the shaft section 41*b* and is fitted with the outer peripheral surface of the shaft section 41*b*. The seal member 50 is also referred to as bush or the like.

In the present embodiment, the packing 60 is provided between the housing main body 11 and the rear cover 12. The packing 60 prevents foreign matters such as moisture and dust from intruding into the inside of the connector 1 through an annular gap between the housing main body 11 and the rear cover 12 (the shield shell 20). The packing 60 is formed by an elastically deformable member such as rubber or resin. For example, the packing 60 is formed in an annular shape extending along the outer peripheral surface of the rear cover 12 and is fitted with the outer peripheral surface of the rear cover 12. The packing 60 is interposed between the end portion on one side in the fitting direction X of the housing main body 11 and the outer peripheral surface of the rear cover 12 in a state in which the rear cover 12 is integrated with the housing main body 11. In the present embodiment, the fastening member 40 is provided on the inner side of the waterproof region formed by the two packings 30 and 60 explained above.

Subsequently, a work operation of fitting the connector 1 having the configuration explained above to the mating connector 110 (see FIG. 1) and fixing the connector 1 to the fixed wall surface 103*a* of the mating device 100 is explained. First, in a state in which the bolt 41 of the fastening member 40 is inserted through the through-hole 2*a* of the shield shell 20, the through-hole of the rear cover 12, and the center hole of the housing main body 11 in the connector 1, an operator inserts and screws the bolt 41 into the fastening hole 104 of the fixed wall surface 103*a*.

At this time, in the connector 1, since the bolt 41 penetrates the center of the cylindrical section 11A in the fitting direction X, the inclination of the connector 1 with respect to the fixed wall surface 103*a* is suppressed. When the operator further tightens the bolt 41, the cylindrical section 11A is fitted with the mating connector 110 and the terminals 3 are connected to terminals of the mating connector 110. As explained above, the bolt 41 of the fastening member 40 functions as an assist bolt at the time when the cylindrical section 11A and the mating connector 110 are fitted with each other.

In the connector of the related art, since the bolt 41 is provided on the outer side of the cylindrical section 11A, that is, at a position away from the center of the cylindrical section 11A, it is likely that the connector 1 is inclined with respect to the fixed wall surface 103*a* when the bolt 41 is fastened. In this regard, according to the present embodiment, since the bolt 41 penetrates the center of the cylindrical section 11A in the fitting direction X, it is possible to prevent the connector 1 from being inclined with respect to the fixed wall surface 103*a* when the bolt 41 is fastened. Therefore, it is possible to prevent the terminals 3 from coming into contact with the terminals of the mating connector 110 in an inclined state to cause prying or the like among the terminals 3.

As explained above, the connector 1 and the wire harness WH in the present embodiment include the casing 2 that holds, on the inside, the terminal 3 provided at the end of the electric wire W and includes the cylindrical section 11A fitted with the mating connector 110 of the mating device 100 (a connection target) in the fitting direction X, the packing 30 that seals the annular space between the outer peripheral surface of the cylindrical section 11A and the mating connector 110, the fastening member 40 that is attached to penetrate the inside of the cylindrical section 11A in the fitting direction X from the through-hole 2*a* formed in one end face in the fitting direction X of the casing 2 and is fixed to the fixed wall surface 103*a* of the mating device 100 in a state in which the cylindrical section 11A and the mating connector 110 are fitted together, and the seal member 50 that seals the annular gap between the outer peripheral surface of the fastening member 40 and the inner surface of the through-hole 2*a*. With this configuration, in the connector 1 and the wire harness WH, for example, the fastening member 40 can be provided, by the seal member 50, on the inner side of the cylindrical section 11A, that is, the inner side of the waterproof region formed by the packing 30. As a result, the connector 1 and the wire harness WH can suppress an increase in the size of the casing 2 and can configure the casing 2 to be smaller.

In the connector 1 and the wire harness WH in the present embodiment, the fastening member 40 includes the bolt 41 inserted through the through-hole 2*a* and the waterproof washer 42 including the annular washer main body 42*a* interposed between the head 41*a* of the bolt 41 and the peripheral edge portion of the through-hole 2*a* and the annular water cutoff rubber 42*b* interposed between the inner surface of the washer main body 42*a* and the shaft section 41*b* of the bolt 41 and adjacent to the seal member 50 in the fitting direction X. With this configuration, in the connector 1 and the wire harness WH, for example, intrusion of water from the through-hole 2*a* to the inside of the casing 2, that is, the inner side of the waterproof region formed by the packing 30 can be further suppressed by the waterproof washer 42 of the fastening member 40.

In the connector 1 and the wire harness WH in the present embodiment, the electric wire W is drawn out in the height direction Z intersecting the fitting direction X with respect to the casing 2. With this configuration, in the connector 1 and the wire harness WH, for example, the connector 1 and the wire harness WH can be more simply configured. Further, the fastening member 40 that is relatively easily inserted through the through-hole 2*a*, the seal member 50 that seals the gap between the outer peripheral surface of the fastening member 40 and the inner surface of the through-hole 2*a*, and the like can be provided on one end face in the fitting direction X of the casing 2.

In the present embodiment, a case in which the electric wire W is drawn out in the height direction Z intersecting the fitting direction X with respect to the casing 2 is exemplified. However, without being limited to this example, for example, the electric wire W may be drawn out in the fitting direction X with respect to the casing 2 or may be drawn out in the width direction Y. In the present embodiment, a case in which the casing 2 is configured by combining the plurality of components including the housing 10 and the shield shell 20 is exemplified. However, without being limited to this example, for example, the casing 2 may be configured by one component. The packing 60 may be provided, for example, between the housing 10 and the shield shell 20.

A connector and a wire harness according to the present embodiment include a seal member that seals an annular gap between an outer peripheral surface of a fastening member and an inner surface of a through-hole formed on one end face in a fitting direction of a casing. With this configuration, in the connector and the wire harness, for example, the fastening member can be provided, by the seal member, on the inner side of a cylindrical section, that is, the inner side of a waterproof region by a packing. As a result, the connector and the wire harness achieve an effect that it is possible to suppress an increase in the size of the casing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:

a casing including a cylindrical section that holds, on an inside, a terminal provided at an end of an electric wire and is fitted with a mating connector of a connection target in a fitting direction;

a packing that seals an annular space between an outer peripheral surface of the cylindrical section and the mating connector;

a fastening member that is attached to penetrate the inside of the cylindrical section in the fitting direction from a through-hole formed in one end face in the fitting direction of the casing, and is fixed to a fixed wall surface of the connection target in a state in which the cylindrical section and the mating connector are fitted with each other; and a seal member that seals an annular gap between an outer peripheral surface of the fastening member and an inner surface of the through-hole, wherein the fastening member includes:

a bolt inserted through the through-hole; and a first waterproof washer including a first annular washer main body interposed between a head of the bolt and a peripheral edge portion of the through-hole, and a first annular water cutoff rubber interposed between an inner surface of the first annular washer main body and a shaft section of the bolt, and the seal member is interposed between the outer peripheral surface of the shaft section of the bolt and the inner surface of the through-hole, and is positioned adjacent to the first annular water cutoff rubber in the fitting direction.

2. The connector according to claim 1, wherein the fastening member includes a second waterproof washer provided spaced apart from the first waterproof washer in the fitting direction, the second waterproof washer includes a second annular washer main body and a second annular water cutoff rubber interposed between an inner surface of the second annular washer main body and the shaft section of the bolt, the seal member is provided between the first annular water cutoff rubber of the first waterproof washer and the second annular water cutoff rubber of the second waterproof washer.

3. The connector according to claim 1, wherein the electric wire is drawn out in a height direction intersecting the fitting direction with respect to the casing.

4. The connector according to claim 2, wherein the electric wire is drawn out in a height direction intersecting the fitting direction with respect to the casing.

5. A wire harness comprising:

an electric wire having conductivity; and a connector provided at an end of the electric wire, wherein the connector includes:

a casing including a cylindrical section that holds, on an inside, a terminal provided at the end of the electric wire and is fitted with a mating connector of a connection target in a fitting direction;

a packing that seals an annular space between an outer peripheral surface of the cylindrical section and the mating connector;

a fastening member that is attached to penetrate the inside of the cylindrical section in the fitting direction from a through-hole formed in one end face in the fitting direction of the casing, and is fixed to a fixed wall surface of the connection target in a state in which the cylindrical section and the mating connector are fitted with each other; and a seal member that seals an annular gap between an outer peripheral surface of the fastening member and an inner surface of the through-hole, wherein the fastening member includes:

a bolt inserted through the through-hole; and a first waterproof washer including a first annular washer main body interposed between a head of the bolt and a peripheral edge portion of the through-hole, and a first annular water cutoff rubber interposed between an inner surface of the first annular washer main body and a shaft section of the bolt, and the seal member is interposed between the outer peripheral surface of the shaft section of the bolt and the inner surface of the through-hole, and is positioned adjacent to the first annular water cutoff rubber in the fitting direction.

* * * * *